United States Patent [19]

Jorzyk et al.

[11] Patent Number: 4,936,881
[45] Date of Patent: Jun. 26, 1990

[54] COOLING TOWER FOR STEAM-POWERED PLANTS

[75] Inventors: Sigurd Jorzyk, Saarbrücken; Gerhard Schöll, Spiesen-Elversberg; Heinz Hölter; Heinrich Igelbüscher, both of Gladbeck; Heinrich Gresch, Dortmund-Wickede; Heribert Dewert, Gladbeck, all of Fed. Rep. of Germany

[73] Assignee: Saarbergwerke Aktiengesellschaft, Saarbrucken, Fed. Rep. of Germany

[21] Appl. No.: 369,643

[22] Filed: Jun. 21, 1989

Related U.S. Application Data

[60] Continuation-in-part of Ser. No. 179,655, Apr. 8, 1988, which is a division of Ser. No. 937,204 filed as PCT EP86/00111 on Mar. 4, 1986, published as WO86/05577 on Sept. 25, 1986, now Pat. No. 4784,810.

[30] Foreign Application Priority Data

Mar. 16, 1985 [DE] Fed. Rep. of Germany ....... 3509542
Mar. 16, 1985 [DE] Fed. Rep. of Germany ....... 3509543

[51] Int. Cl.$^5$ ............................................. B01F 3/04
[52] U.S. Cl. .......................................... 55/228; 55/242; 55/257.2; 261/17; 261/109; 261/150; 261/DIG. 11

[58] Field of Search ...................... 55/242, 228, 257.2; 261/DIG. 11, 17, 109, 150

[56] References Cited

U.S. PATENT DOCUMENTS

| 3,488,960 | 1/1970 | Kirkpatrick | 261/DIG. 11 |
| 3,914,378 | 10/1975 | Selmeczi | 55/257.2 |
| 4,273,146 | 6/1981 | Johnson | 137/5 |

FOREIGN PATENT DOCUMENTS

0129775  1/1985  European Pat. Off. .... 261/DIG. 11

OTHER PUBLICATIONS

Hawley, The Condensed Chemical Dictionary, 10--5-84.

Primary Examiner—Tim Miles
Attorney, Agent, or Firm—Herbert Dubno

[57] ABSTRACT

A cooling tower has a flue gas outlet extending upwardly above the heat exchanger baffles in which the water from a steam power plant is cooled in counterflow to a rising cooling air stream. The mouth of the duct is formed with a droplet trap supplied with rinse water and cooperates with a collector for the rinse water which is led out of the tower independently of the cooled water of the heat exchanger zone.

12 Claims, 2 Drawing Sheets

COOLING TOWER FOR STEAM-POWERED PLANTS

CROSS REFERENCE TO RELATED APPLICATION

THis application is a continuation-in-part of our copending application Ser. No. 07/179,655 filed Apr. 8, 1988, which is a division of 06/937,204, filed as PCT EP86/00111 on Mar. 4, 1986, published as WO86/05577 on Sep. 25, 1986 now pat. no. 4,784,810.

FIELD OF THE INVENTION

Our present invention relates to a cooling tower for a steam-powered plant or a steam-powered plant including an improved cooling apparatus having a cooling tower and, more particularly, relates to the construction of the cooling tower and related apparatus. The invention also relates to a method of operating a cooling apparatus for a steam-powered plant.

The term "steam-powered plant" is used herein to refer to fossil-fueled systems in which steam formed in a boiler is used to drive a steam-operated machine which can be a turbine or engine connected with an electrostatic power generator, where condensate from the main stream cycle is further cooled, e.g. with the aid of a natural draft cooling tower, where flue gases are generated, e.g. in the production of steam, and, in short, particularly to fossil-fuel electricity generating power plants. However, the invention is equally applicable to any system producing water to be cooled in a natural draft cooling tower, where flue gases must ultimately be released into the atmosphere, and in which the flue gases can derive from the steam production plant or apparatus or some other source in a plant having a steam powered machine.

BACKGROUND OF THE INVENTION

It is known to cool the cooling water from a steam-powered machine, e.g. a condensate from a condensor receiving depleted steam therefrom or water circulated through a condensor associated with the steam cycle, in a natural draft cooling tower by causing the water to be cooled to trickle over baffles provided generally at a lower portion of the upright tower above an air inlet thereto.

The shape of the tower is that of a nozzle, e.g. a venturi nozzle with a progressive and curvilinear reduction in cross section upwardly to an outlet end disposed well above a sump below the air inlet and in which the cooled water collects.

The water to be cooled thus flows countercurrent to or in counterflow to the rising current or flow of cooling air which is accelerated upwardly by heating from the water to be cooled and the constricted flow cross section.

It is known, moreover, to utilize such a tower to discharge flue gases forming a combustion system, e.g. a boiler, into the atmosphere. In this case a gas outlet pipe, receiving the flue gas, can open above the heat exchanger zone provided with the baffles into the rising air stream.

In recent years the legal limits for solids, toxic and noxious contaminants in the flue gases from large scale combustion installations such as power plant boilers have been greatly reduced to the point where the flue gas must be subjected to an intensive gas cleaning operation.

Part of this gas cleaning operation, as a rule, requires a wet scrubbing or washing of the flue gas in conjunction with the addition of absorbents serving as a desulfurization medium.

The cleaned flue gas generally leaves the desulfurization apparatus at a temperature of 40° to 60° C. and must, if it is to be discharged by a conventional smoke stack, be heated at a temperature of about 80° to 100° C. to provide the requisite draft in the stack.

Naturally, this reheating has significant energy requirements. For example, in the case of a 70 MW power plant operating at full capacity, more than 2.5 million cubic meters of flue gas per hour must be reheated to the requisite temperature for discharge at the smoke stack.

It has been proposed heretofore to avoid the reheating of the flue gases, especially in fossil-fuel power plants, by feeding the cleaned flue gas into the cooling air stream which rises in the cooling tower generally provided in such plants, at a location above the heat exchange zone within the cooling tower.

The rising cooling air thus effectively becomes a transport medium for the flue gases. Because the force which causes the rising column of cooling air is a thermally created force other than that which may require a reheating of the flue gas, the expensive reheating step can be avoided.

Indeed, in newly constructed power plants operating in accordance with this principal, a smoke stack or chimney for discharge of the flue gases can be dispensed with altogether.

A further advantage of this process is that the flue gases before they reach the atmosphere are additionally diluted by the transport medium, i.e. the cooling gas flow so that residual toxic concentrations upon release into the atmosphere can be markedly reduced. Of course, a precondition for this method and the improvements which it entails is that the flue gas introduced into the rising cooling air stream will be distributed in this cooling air stream and is uniformly mixed therewith.

In a conventional apparatus which operates in this manner, the flue gas is introduced into the cooling air stream of the cooling tower via a gas outlet duct which opens in a chimney-like fashion, i.e. freely, above the heat exchange zone or baffle region of the cooling tower and which is provided with a central flue gas feed.

Power plants of medium dimensions and outputs generally have up to 600 kg/hour of scrubbing water entrained with the wet-cleaned flue gas in spite of the fact that generally at the outlet of the flue gas desulfurizing unit or scrubber, a droplet or mist collector is provided.

When the desulfurizing scrubber for the flue gas is operated with limestone as an absorbent, the solids content of the entrained scrubbing water can be up to about 20% by weight. As a consequence, the flue gas which is discharged into the cooling tower and through the cooling tower into the atmosphere can entrain up to 120 kg/hour of solids with the entrained scrubbing water.

At a quite normal operating period of about 8000 hrs per year, these figures mean that substantially 960 metric tons of solids are released into the atmosphere and/or deposit in the feedlines to the flue gas outlet duct and, in the latter case can block or plug up the apparatus.

When the cooling tower itself is provided with mist or droplet collectors or traps, deposits of these solids can develop on the surfaces thereof to create detrimental obstructions.

As a consequence, the duty cycle of the apparatus can be adversely effected by the times required for cleaning the surfaces, heat exchange and mist or droplet collection efficiency may be reduced to the detriment of the environment, and it may be necessary to interrupt the operation or effect cleaning during intervals of high electric output, thereby further contributing to the decreased effectiveness of the plant.

OBJECTS OF THE INVENTION

It is the principal object of the present invention to provide an improved apparatus and method whereby these drawbacks are avoided and a cooling tower or cooling apparatus for a steam-operated plant can be made or operated to suffer less downtime and, nevertheless, can ensure strict adherence to environmental standards.

Another object of this invention is to extend the principles set forth in our above-identified copending application.

It is also a general object of this invention to provide a method of and an apparatus for the cooling of water at a steam-operated plant which can more effectively handle flue gases without the disadvantages enumerated above.

SUMMARY OF THE INVENTION

These objects and others which will become apparent hereinafter are attained, in accordance with the present invention, by providing in the or each gas outlet duct opening above the baffle means forming the heat exchanger of the cooling tower and at the outlet cross section thereof, a droplet-trapping stack of baffles, by juxtaposing the droplet-trapping stack of baffles with nozzle arrangements for spraying rinsing liquid onto these baffles, by providing a collector for the rinsing liquid of the droplet-trapping stack also in the region of the outlet cross section and by connecting this collector with a pipe system for conducting the connected rinsing water out of the cooling tower.

According to the invention, therefore, the droplet collecting stack can be periodically rinsed and cleaned without interrupting the operating of the cooling tower or the desulfurization apparatus and consequently, without adverse effect on the cooling tower, the flue gas desulfurization unit and the power plant itself. Preferably, the droplet trapping stack has nozzles juxtaposed with both its upstream and downstream sides so that both the upstream and the downstream sides can be sprayed with water with respect to which a relatively large droplet spectrum is advantageous so that the water jets can reliably scour all agglomerated particles from both the upstream and the downstream sides and wash the solids downwardly.

The rinsing liquid, according to this invention, is collected and separately removed from the cooling tower. It does not collect in the sump of the cooling tower where it can mix with cooled water.

The rinsing liquid which is scrubbed from the droplet trap and is separately let out of the cooling tower can advantageously be fed to the scrubbing water preparation stage which, together with a scrubbing column, can form part of the wet desulfurization apparatus of the power plant. The rinsing water is thus treated together with the scrubbing liquid.

A special treatment of the rinsing liquid is not necessary, although, as will be apparent from the discussion below, recycling is advantageous, especially when the scrubbing liquid is treated to contain an organic acid to maintain its pH at four or below.

Advantageously, the scrubbing liquid prior to its recycling to the flue gas cleaning stage can be utilized for the flushing and cleaning of the demister and droplet trapping which generally is provided immediately downstream of the desulfurizing scrubber. Any fresh rinsing liquid which is necessary can be drawn directly from the scrubbing water treatment cycle of the gas cleaning column.

Advantageously, the flow velocity of the flue gas into the upwardly extending gas discharge duct is reduced in the region of the demister stack to avoid an entrainment of collected or condensed scrubbing water as the flue gas passes through this demister. This can be achieved, according to the invention, by providing immediately upstream of the demister stack, a region of progressive flow cross section increase. In the flow direction, directly downstream of the demister stack the flow cross section can again be constricted, preferably through a venturi-nozzle to obtain a type sufficiently high jetlike injection of the flue gases into the rising cooling air stream.

According to a feature of the invention, the collector for the rinsing liquid is a trough provided in the gas outlet duct directly below the droplet-trapping stack of this demister.

In the rising portion of the gas outlet duct, however, rinsing liquid can flow downwardly and be collected. A condensed scrubbing water can additionally be collected and a sump or collection chamber can be provided at the bottom of the rising portion of the stack for such collection.

It has been found to be advantageous in some cases to provide the flue gas inlet pipe and the gas outlet duct both above the heat exchange baffles of the heat exchange zone so that the heating exchange zone need not be traversed by the gas outlet duct. In this case, it is advantageous to provide at the transition region between the flue gas inlet conduit and the upright gas outlet duct, a sump serving as the collector.

In this case, of course, the upright portion of the gas outlet duct is somewhat shorter and, in accordance with another feature of the invention, on the inner wall of the gas outlet duct, noses, pockets or like downwardly open structures can be provided to prevent upward entrainment by the gas of the downwardly flowing liquid. It also has been advantageous in conjunction with these features to have the flue gas inlet conduit inclined slightly downwardly from the horizontal in the inward direction so that any scrubbing liquid which may condense or collect on the walls of this conduit can likewise flow downwardly to the sump.

We have found that generally the encrustation of the demister stack can be reduced or eliminated by controlling the pH value of the rinsing liquid.

Advantageously, this is done by the addition of a carboxylic acid, preferably formic acid, to maintain the pH value of at most 4. The carboxylic acid acts as a lime-solubilizing agent. In this case, of course, the collected laden rinsing liquid should not be fed to the scrubbing water treatment and recirculation stage, but rather should be subjected to a separate treatment step, e.g. by sedementation, and the decantate recycled to the nozzle arrangements spraying the rinsing water on the demister or droplet-trapping baffles at the outlet cross section of the gas outlet duct.

The apparatus of the invention, more specifically, can comprise:
- an upright natural draft cooling tower having a lower end formed with an inlet for cooling air and an outlet open to the atmosphere;
- large-area baffle means in the cooling tower at the lower end but above the inlet for effecting heat exchange between rising cooling air and descending water to be cooled in the tower;
- means for feeding the water to be cooled from the plant to the baffle means in the cooling tower for cooling of the water in counterflow to the rising cooling air;
- at least one generally upright gas-outlet duct disposed in the cooling tower and having an inlet at a lower end of the gas-outlet duct and an outlet cross section at an upper end of the gas outlet duct located above the baffle means;
- conduit means connected to a gas-cleaning apparatus for delivering a cleaned flue gas from the gas-cleaning apparatus to the inlet at the lower end of the gas-cleaning duct;
- a droplet trap in the outlet cross section of the gas-outlet duct above the baffle means, the droplet trap comprising:
- a stack of droplet-trapping baffles traversed by the cleaned flue gas,
- nozzle means for flushing the baffles of the droplet trap with a rinsing liquid, and
- collecting means below the droplet-trapping baffles for collecting rinsing liquid from the baffles of the droplet trap; and
- a pipe system connected to the collecting means for conducting collected rinsing liquid from the tower.

The method, therefore, comprises the steps of:
(a) generating steam by boiling a feed water in a fossil-fueled boiler, thereby producing a flue gas;
(b) driving a steam machine with the steam produced in step (a) and condensing depleted steam from the machine to produce water to be cooled;
(c) cooling the water to be cooled by causing the water to be cooled to flow downwardly over heat-exchange baffles disposed in a lower portion of an upright cooling tower having an air intake at the lower portion below the heat-exchange baffles whereby a natural draft of air passes upwardly through the tower to cool the water on the baffles, and recycling the cooled water to the boiler;
(d) cleaning the flue gas at least in part by scrubbing it with water to produce a wet-cleaned flue gas;
(e) feeding the wet-cleaned flue gas to an inlet at a lower end of a gas-discharge duct disposed in the tower and having an outlet cross section at an upper end of the duct lying above the heat-exchange baffles in the tower;
(f) discharging the wet-cleaned flue gas into the tower from the duct through a droplet trap formed with a stack of droplet-trapping baffles at the outlet cross section while flushing the droplet-trapping baffles with a rinsing liquid;
(g) collecting rinsing liquid from the droplet-trapping baffles after the droplet-trapping baffles have been flushed with the rinsing liquid; and
(h) adjusting the pH of the rinsing liquid prior to flushing the droplet-trapping baffles therewith to a pH value of at most 4 by adding a carboxylic acid to the rinsing liquid.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
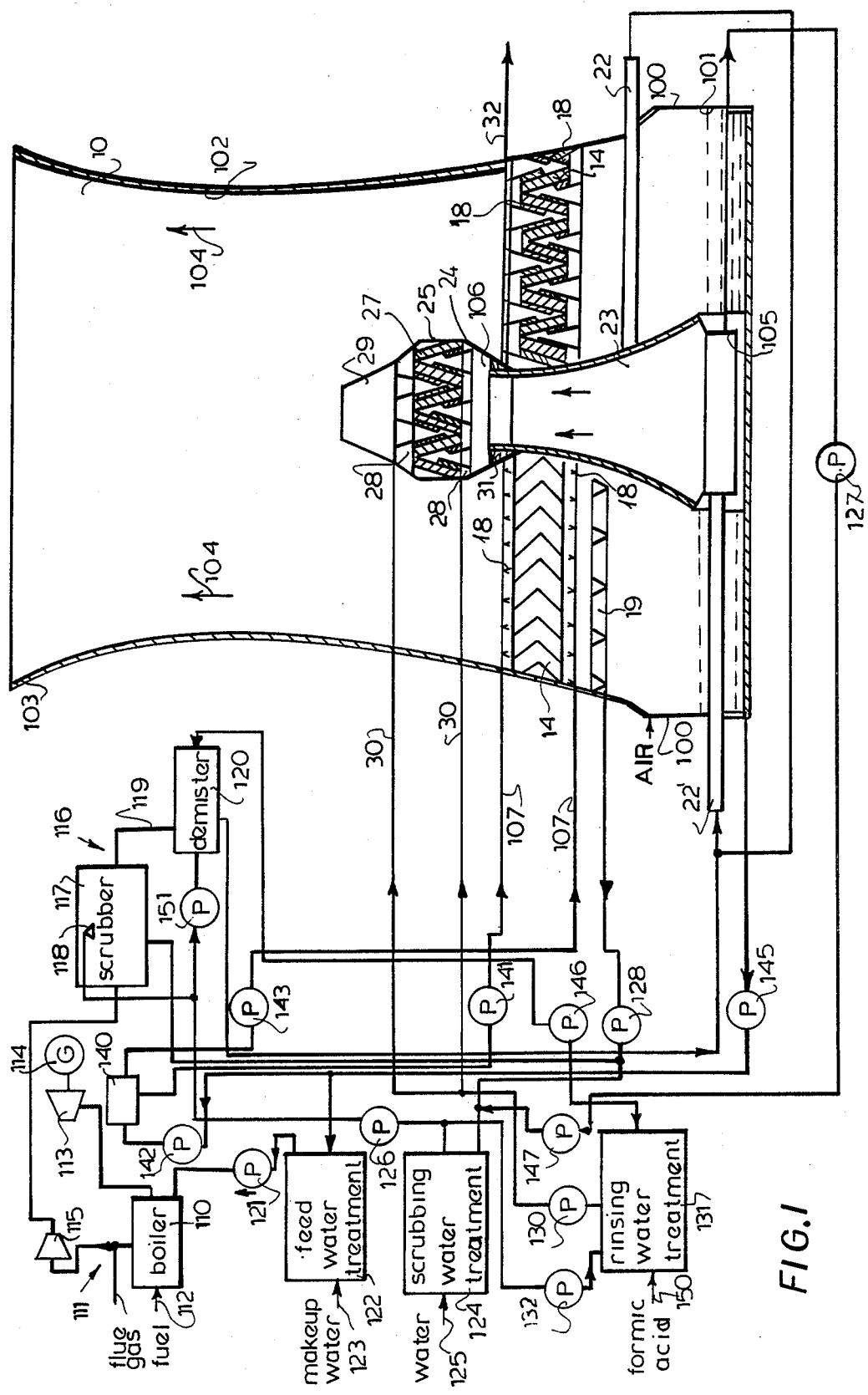
FIG. 1 is a vertical section through a cooling tower according to the invention, illustrating the remainder of the plant with which the cooling tower is associated in a block or flow diagram form.

As can be seen from FIG. 1, a previously cleaned and preferably wet-scrubbed flue gas is fed via a conduit 22 into the cooling tower 10 to a gas outlet duct 23 located centrally of the cooling tower 10. The cooling tower 10 has air intakes 100 located above a sump 101 in which the cooled liquid is collected and has an inner wall 102 which initially converges upwardly in a curvilinear taper to then widen outwardly to a mouth 103 located well above ground level and forms a venturi-type acceleration for a rising cooling air flow represented by the arrows 104.

The gas outlet duct 23 likewise is tapered in the upward direction in a curved configuration to accelerate the flow of the flue gas therethrough and comprises a sump 105 into which an addition quantity of flue gases can be introduced through the conduit means represented at 22' in FIG. 1.

The gas outlet cross section 106 of the duct 23 is located above an array of baffles 14 which can be stacks of plates or any other convenient baffle system which can be traversed by the rising flow of air and is located at a lower portion of the tower immediately above the air intakes 100.

Juxtaposed with baffles 14 are nozzles 18 connected to supply pipes 107 delivering the water to be cooled to the baffles.

If desired, when the baffles are rinsed for cleaning purposes, a collector 19 can be provided to collect rinsing water from the baffles. The cooling water normally, however, collects in the sump 101 previously described.

At the outlet end of the duct 23, an upwardly widening flow cross section 24 is provided and in the widening region 25, a droplet trapping stack or collections of stacks of baffles 27 can be provided.

Above the droplet trap stack of baffles 27, an upwardly converging flow section 29 of a venturi nozzle shape can be provided to again increase the velocity of the stack gases as they enter the rising cooling gas.

Both at the upstream side and at the downstream side of the droplet-trapping stacks 27, nozzle arrangements 28 are provided which are connected with pipes 30 for delivering fresh rinsing water to the stacks as previously described.

Below the stacks 27, a collector 31 is provided for the rinsing water and entrained particles which are rinsed from the plate of the stack 27. This collector can have the form of an annular trough within the frustoconical portion 24 and surrounding the outlet of the gas outlet duct 23. The collector 31 can be connected by a duct 32 with the scrubbing water treatment part of the flue gas desulfurization plant.

When, of course, the flue gas is not introduced upwardly parallel to the cooling gas stream into the cooling tower, but rather is fed laterally into the cooling transverse to the cooling gas stream, the collector may be a trough located externally of the gas outlet pipe 23.

As is also apparent from FIG. 1, the flue gas fed at 22 or 22' to the gas outlet pipe 23 can derive from a boiler 110 of a steam powered plant 111 which is fired by a fossil fuel as represented at 112. The steam from the boiler may be fed to one or more steam-powered machines 113 shown to be turbines driving the generators, one of which has been shown at 114.

The flue gas, via a blower 115, if necessary, is subjected to gas cleaning in a gas cleaning portion 116 of the plant which is shown to include a scrubber 117 forming part of a desulfurizing system. For example, a scrubbing liquid may be sprayed at 118 after it has been charged with limestone or lime, into the flue gas rising in the scrubber 117. The wet-cleaned flue gas may be led at 119 to a demister 120 from which the wet-cleaned flue gas is fed via lines 22 and 22' to the gas outlet duct 23.

The feed water for the boiler may be supplied by a pump 121 from the feed water treatment apparatus 122 to which make up water can be sprayed at 123. The scrubbing water treatment is represented at 124 and make up water for the scrubbing is supplied at 125. A pump 126 supplies the scrubbing water to the scrubber 117 as previously described and pumps 127 and 128 can return rinsing water, contaminated with particulates, from the stack 27 or the baffles 14 to the scrubbing water treatment apparatus 124.

The rinsing water for the spray nozzles 28 of the trapping baffles 27 can be delivered by pump 130 to the pipes 30 from a rinsing water treatment apparatus 131 or can be drawn from the said water treatment apparatus 122 as may be desired or from the water feed 125 of the scrubbing water treatment.

A pump 132 illustrates that at least some of the rinsing water can be drawn from the scrubbing water treatment system.

The steam powered machine 113 is provided with a heat exchanger 140 from which the water to be cooled can be delivered by the pump 141 to the spray nozzles of the baffles 14 so that the water then trickles over the baffle surfaces in counterflow to the rising cooling air stream which moves under natural draft as is known per se.

The heat exchanger 140 may be cooled, in turn, by water drawn in part from the sump 101 via the pump 142 or by water from some other source and this cooling water may also be cooled by being fed by the pump 143 to the pipes 107 of the spray units 18 previously described. The pump 145 can serve to draw water from the sump of the cooling tower and supply it as feed water to the water unit 122 previously described or to the heat exchanger 140.

A pump 146 returns rinsing water, which can be used to flush the demister 120, to the rinsing water treatment 131 and a pump 147 can deliver rinsing water which may be contaminated to the scrubbing water treatment as desired. Formic acid can be added at 150 to the rinsing water. Finally, a pump 151 can be provided to draw rinsing water from the scrubbing water circulation to feed the rinsing nozzles of the demister 120.

Figure 2:
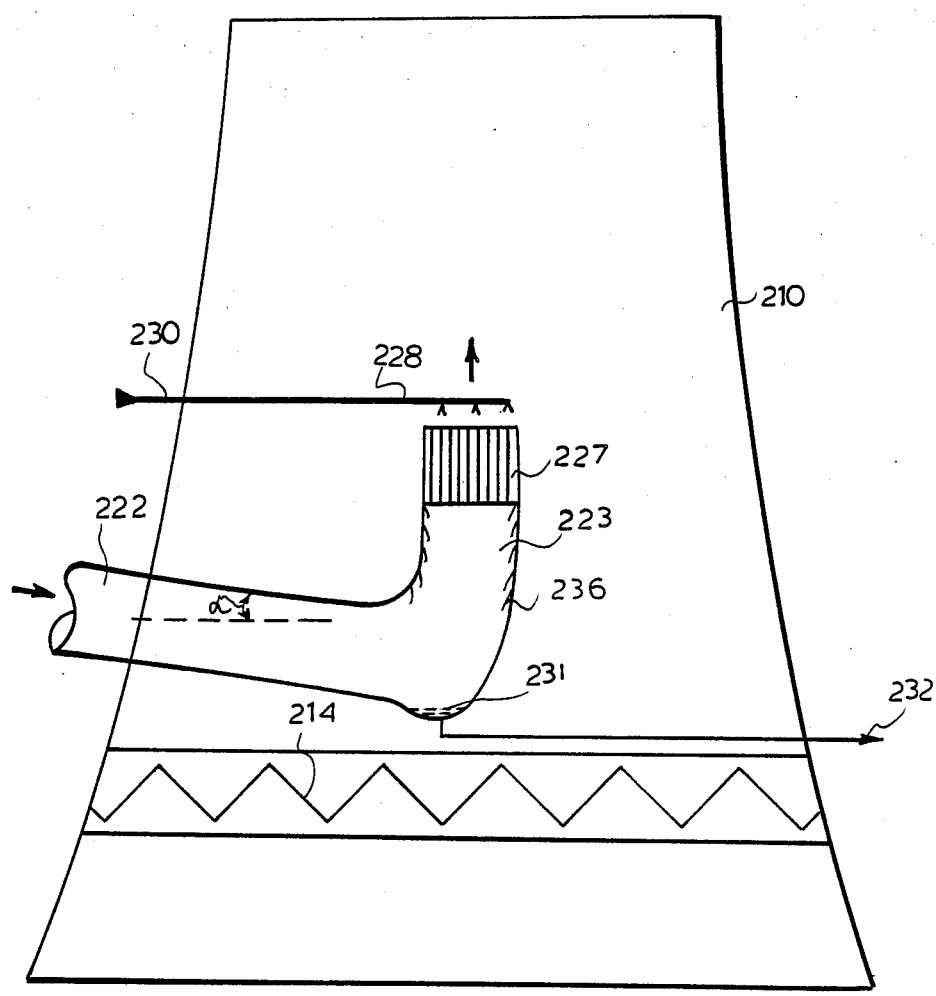
FIG. 2 is a diagrammatic section illustrating another embodiment of the invention.

FIG. 2 shows that the mouth of the gas outlet duct 223 can lie above the heat exchanger zone represented by the plates 214 and that the conduit or duct 222 which feeds the flue gas outlet duct 223 can likewise be located above the heat exchange zone 214 in the schematic illustration of FIG. 2 in which the cooling tower 210 has been illustrated.

In the transition region between the slightly inclined but generally horizontal conduit 222 and the vertical duct 23, a sump 231 is provided as the rinsing water collector. The collected rinsing water and water condensed from the flue gas (condensed or entrained scrubbing water) can be led out via the pipe 232.

The flue gas conduit 22 is inclined at a slight angle downwardly and inwardly so that any scrubbing water condensing in the conduit 222 will be led to the sump or collector 231.

Along the inner wall of the duct 23, noses, baffles or formations 236 are provided to trap droplets which are entrained by the rising flue gas stream before they reach the stack 27 of droplet trapping plants. The spray head 228 delivers rinsing liquid to these plates and is supplied by a conduit 230 analogous to the pipe 30 previously described.

We claim:

1. A cooling apparatus for a steam-powered plant, comprising:
   an upright natural draft cooling tower having a lower end formed with an inlet for cooling air and an outlet open to the atmosphere;
   large-area baffle means in said cooling tower at said lower end but above said inlet for effecting heat exchange between rising cooling air and descending water to be cooled in said tower;
   means for feeding said water to be cooled from said plant to said baffle means in said cooling tower for cooling of the water in counterflow to said rising cooling air;
   at least one generally upright gas-outlet duct disposed in said cooling tower and having an inlet at a lower end of said gas-outlet duct and an outlet cross section at an upper end of said gas outlet duct located above said baffle means;
   conduit means connected to a gas-cleaning apparatus for delivering a cleaned flue gas from said gas-cleaning apparatus to said inlet at said lower end of said gas-cleaning duct;
   a droplet trap in said outlet cross section of said gas-outlet duct above said baffle means, said gas-outlet duct being formed with a divergent portion immediately upstream of said droplet trap having a progressively increasing flow cross section in a direction of flow of said flue gas through said duct, and a convergent portion upstream of said divergent portion and of a progressively decreasing cross section in said direction, said droplet trap comprising:
   a stack of droplet-trapping baffles traversed by said cleaned flue gas,
   nozzle means for flushing said baffles of said droplet trap with a rinsing liquid, and
   collecting means below said droplet-trapping baffles for collecting rinsing liquid from said baffles of said droplet trap; and
   a pipe system connected to said collecting means for conducting collected rinsing liquid from said tower.

2. The cooling apparatus defined in claim 1 wherein said conduit means is connected to a wet gas cleaner of said gas-cleaning apparatus.

3. The cooling apparatus defined in claim 2 wherein said gas-cleaning apparatus includes a scrubbing-water processing unit and said pipe system is connected to said scrubbing-water processing unit.

4. The cooling apparatus defined in claim 3 wherein said nozzle means is connected to a scrubbing water feed line of said gas-cleaning apparatus.

5. The cooling apparatus defined in claim 1 wherein said collecting means is an annular trough below said baffles of said trap.

6. The cooling apparatus defined in claim 1 wherein said collecting means is an annular trough below said baffles of said trap.

7. The cooling apparatus defined in claim 1, further comprising means for adding a carboxylic acid to said rinsing liquid before flushing said baffles therewith to adjust a pH of said rinsing liquid to at most a value of 4.

8. The cooling apparatus defined in claim 7 wherein said means for adding said carboxylic acid is means for adding formic acid to said rinsing liquid.

9. The cooling apparatus defined in claim 8, further comprising means for treating said rinsing liquid following collection thereof, and for recycling the treated rinsing liquid to said nozzle means.

10. A cooling apparatus for a steam-powered plant, comprising:
an upright natural draft cooling tower having a lower end formed with an inlet for cooling air and an outlet open to the atmosphere;
large-area baffle means in said cooling tower at said lower end but above said inlet for effecting heat exchange between rising cooling air and descending water to be cooled in said tower;
means for feeding said water to be cooled from said plant to said baffle means in said cooling tower for cooling of the water in counterflow to said rising cooling air;
at least one generally upright gas-outlet duct disposed in said cooling tower and having an inlet at a lower end of said gas-outlet duct and an outlet cross section at an upper end of said gas outlet duct located above said baffle means;
a conduit extending into said tower above said baffle means and having a transition region with said inlet of said duct formed as a sump for collecting rinsing liquid;
a droplet trap in said outlet cross section of said gas-outlet duct above said baffle means, said droplet trap comprising:
a stack of droplet-trapping baffles traversed by said cleaned flue gas,
nozzle means for flushing said baffles of said droplet trap with a rinsing liquid, and
means for trapping droplets entrained by the flue gas in said duct above said transition region; and
a pipe system connected to said conduit for conducting collecting rinsing liquid from said tower.

11. The cooling apparatus defined in claim 10 wherein said conduit is inclined downwardly and inwardly into said tower.

12. The cooling apparatus defined in claim 10 wherein said duct is formed on an inner wall between said inlet and said trap with downwardly opening nose-shaped pockets.

* * * * *